United States Patent [19]

Malito et al.

[11] Patent Number: 4,663,133

[45] Date of Patent: May 5, 1987

[54] REMOVAL OF HIGH MOLECULAR WEIGHT ORGANIC COMPOUNDS FROM BAYER PROCESS CAUSTIC LIQUOR

[75] Inventors: John T. Malito; Morris L. Roberson, both of Baton Rouge, La.

[73] Assignee: Kaiser Aluminum & Chemical Corporation, Oakland, Calif.

[21] Appl. No.: 773,265

[22] Filed: Sep. 6, 1985

[51] Int. Cl.$^4$ .............................................. C01F 7/06
[52] U.S. Cl. ..................................... 423/130; 423/121
[58] Field of Search ................................ 423/121, 130

[56] References Cited

U.S. PATENT DOCUMENTS 4,215,094  7/1980  Inao et al. ............................ 423/130

FOREIGN PATENT DOCUMENTS

| 30458 | 10/1970 | Japan | 423/600 |
| 62809 | 5/1980 | Japan | 423/121 |
| 227720 | 12/1984 | Japan | 423/600 |
| 2037722 | 7/1980 | United Kingdom | 423/130 |
| 335920 | 2/1978 | U.S.S.R. | 423/600 |
| 1057423 | 11/1983 | U.S.S.R. | 423/600 |

Primary Examiner—H. T. Carter
Attorney, Agent, or Firm—Andrew E. Barlay

[57] ABSTRACT

High molecular weight organic compounds, such as humic acid derivatives, are removed from Bayer process caustic liquors by oxidation of these compounds. The process involves addition of oxygen to the caustic liquor in quantities in the range established by the solubility of the oxygen in the liquor under the oxidation conditions.

6 Claims, 5 Drawing Figures

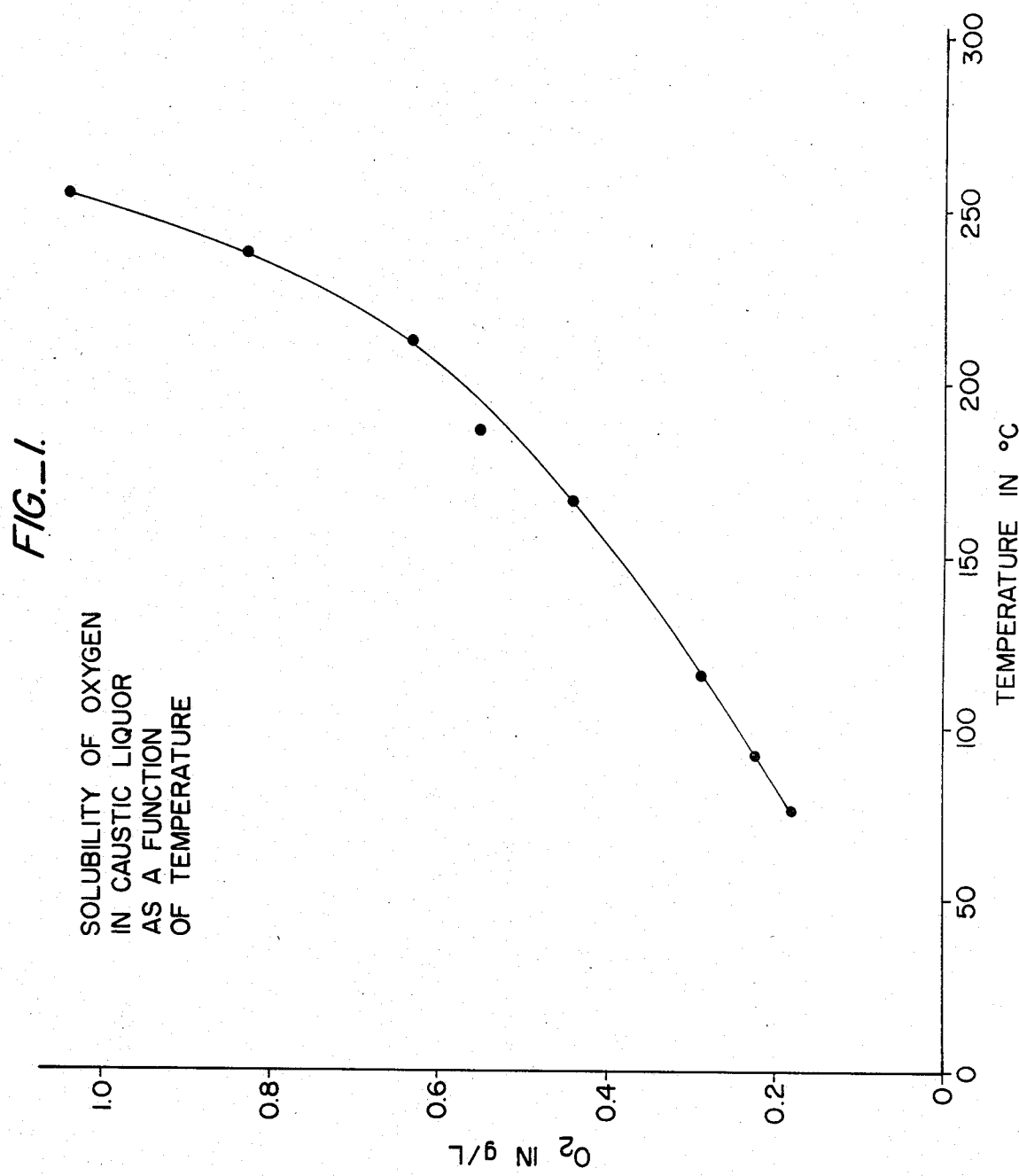

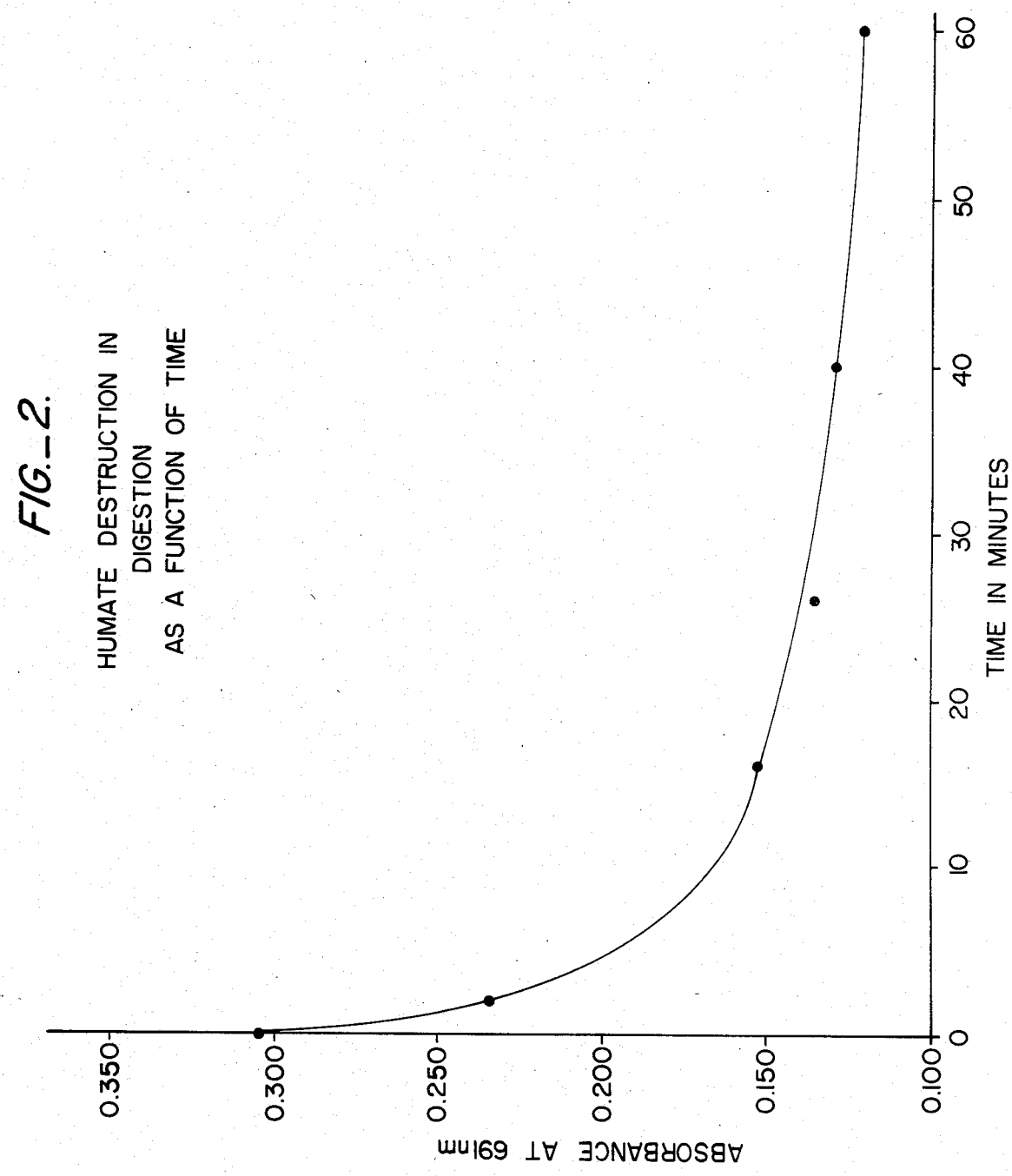
FIG._2.
HUMATE DESTRUCTION IN DIGESTION AS A FUNCTION OF TIME

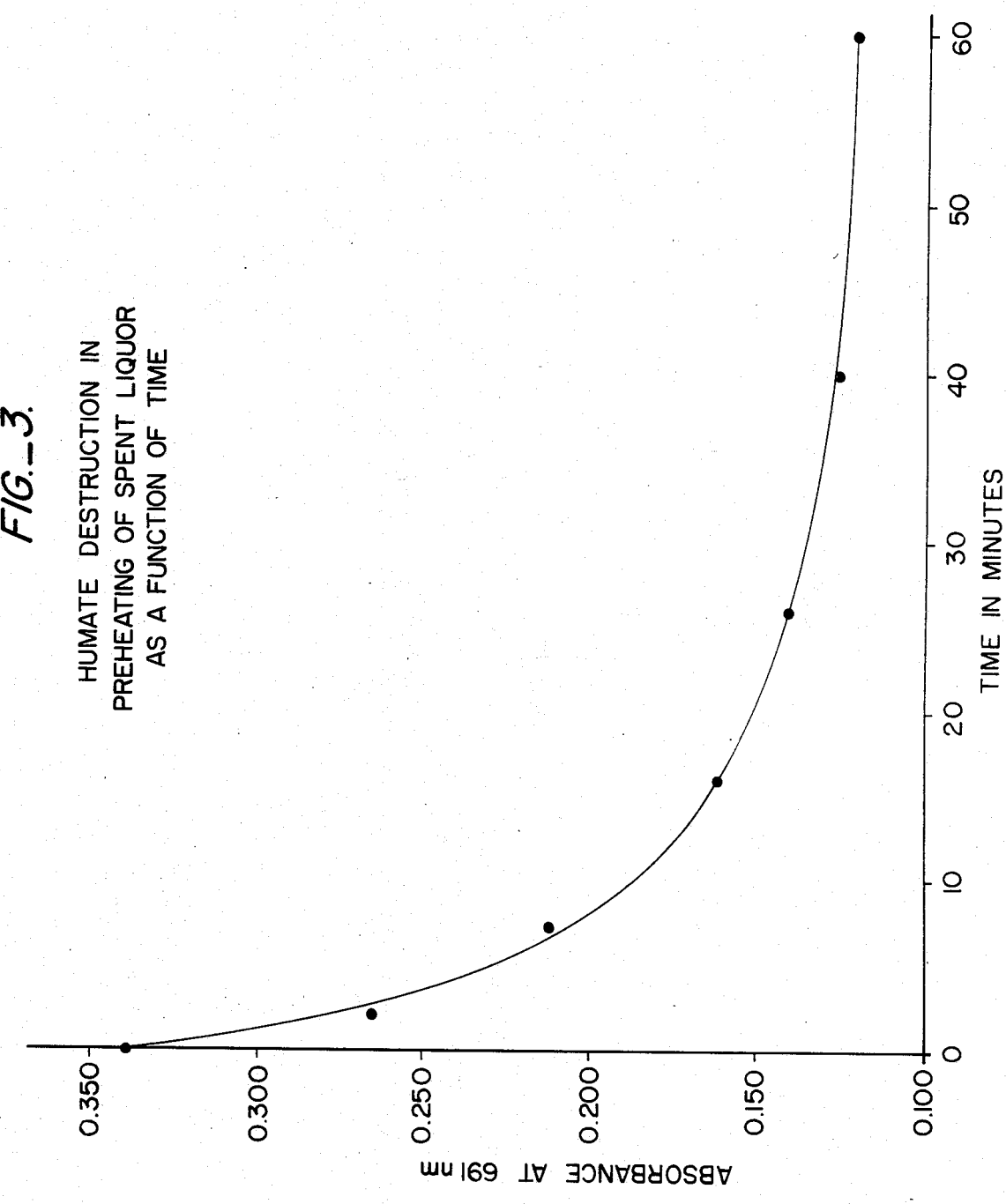

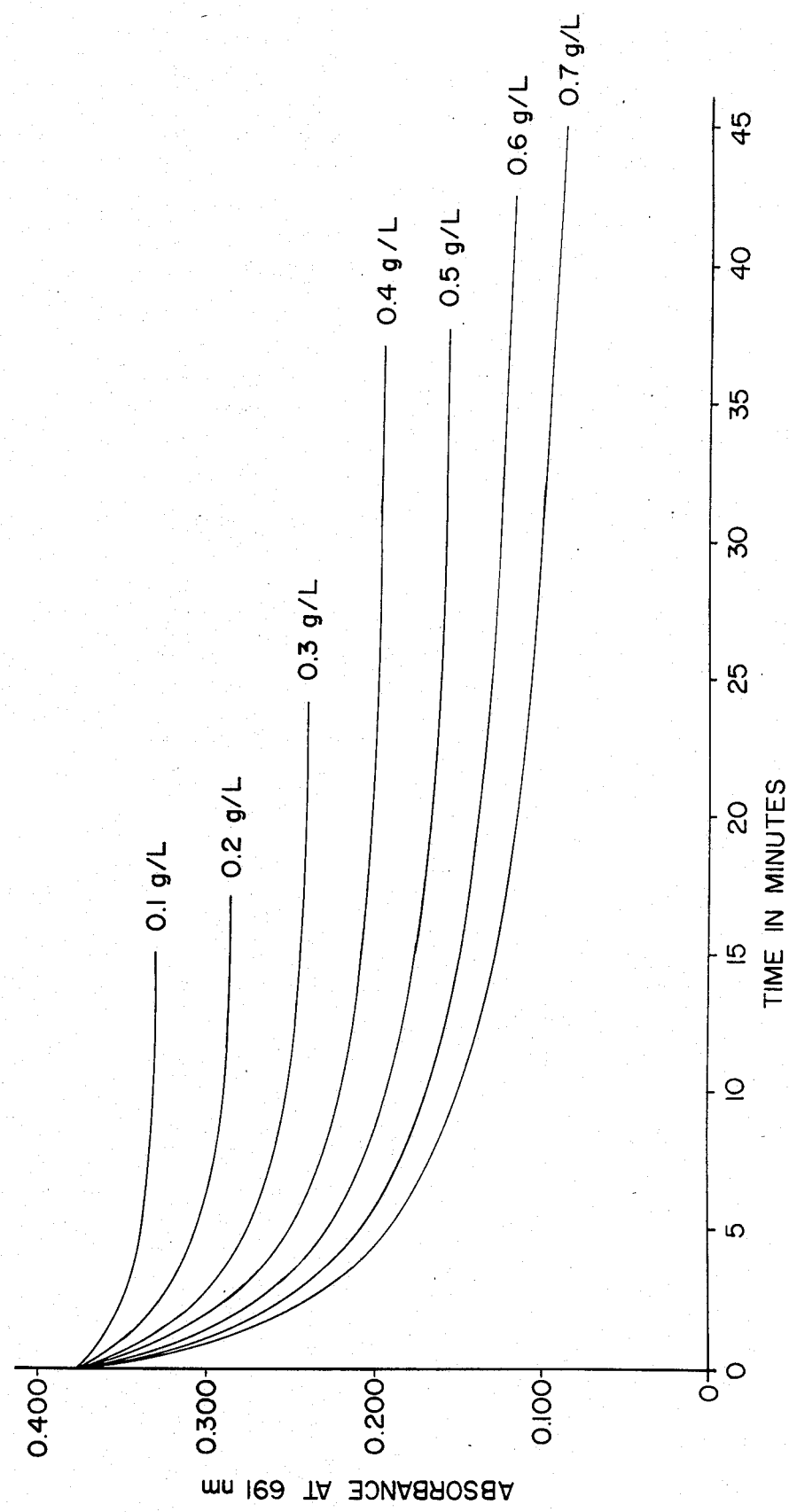
FIG._4.
REACTION OF OXYGEN WITH SPENT BAYER PROCESS LIQUOR AT 200°C AND VARIOUS OXYGEN DOSES

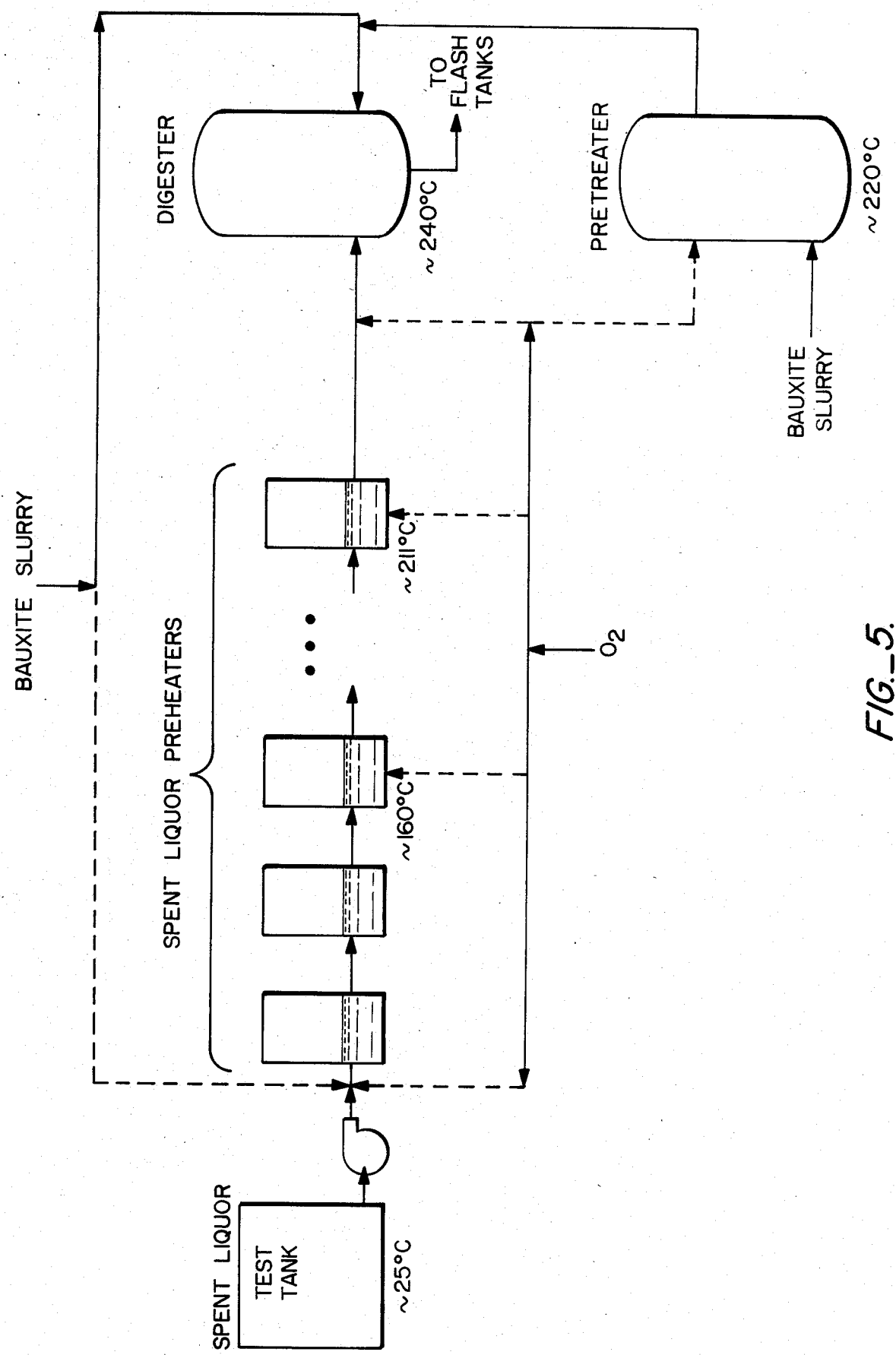
FIG._5.

REMOVAL OF HIGH MOLECULAR WEIGHT ORGANIC COMPOUNDS FROM BAYER PROCESS CAUSTIC LIQUOR

BACKGROUND OF THE INVENTION

The well-known Bayer process involves the manufacture of alumina trihydrate from bauxite by subjecting bauxite in a caustic liquor to digestion at elevated temperatures and pressures. In the digestion step the caustic liquor dissolves the alumina content of the bauxite and a caustic aluminate liquor is obtained together with a caustic-insoluble residue, the so-called "red mud". From the caustic aluminate liquor the alumina content is generally recovered by precipitation.

Most bauxites contain organic matters the quantity of which usually varies with the source of bauxite. The organic matter, which consist of a wide variety of organic compounds of varying molecular weight, is also dissolved by the caustic liquor during digestion and will become part of the alkaline aluminate liquor. The Bayer process is a cyclic process, i.e. the caustic liquor, after precipitation of the alumina content, is recycled to the digestion of a new bauxite charge, and as a result, the dissolved organics accumulate in the caustic liquor. After extended operation of the Bayer process the concentration of the organic compounds increases to a harmful level resulting in decreased alumina trihydrate yields, decreased red mud settling rates and other operational problems. These problems include premature nucleation during alumina trihydrate precipitation and liquor foaming. As mentioned before, the organic compounds dissolved in the liquor vary in molecular weight. These organics can be present as the alkaline salts of lower carboxylic acids (formate, oxalate, acetate) and include salts having seventy or more carbon atoms. These high molecular weight organics are mostly humates derived from humic acids. These humates are a small part of the total dissolved organic content of the liquor but they are considered the most detrimental to the efficient and economical operation of a Bayer process plant. In particular, these humates, apart from their color-forming property, indirectly induce undesired nucleation of saturated alkali aluminate solutions and result in the formation of a large percentage of small ($<45\mu$ size) alumina trihydrate particles, cause foaming and in general interfere with the effective operation of Bayer process plants, particularly in classifying hydrate particles.

The harmful properties of humates has already been recognized and several methods are being offered to at least reduce their undesirable effect on the Bayer process. U.S. Pat. No. 4,046,855 (Schepers et al) discloses a process wherein organic impurities can be removed from Bayer process liquors by contacting the liquor with a magnesium compound which will form a precipitated mixture of magnesium and aluminum hydroxides. This precipitate removes some of the organic impurities either by adsorption or by chemisorption. The magnesium compound may be added at any stage of the Bayer process, additions prior to digestion or to the digested slurry are preferred. Although this process is capable of removing at least a portion of the organic impurities, the formation of a precipitated hydroxide mixture creates operational difficulties. The precipitated hydroxide mixture will contain aluminum hydroxide and this results in product alumina loss. Also, the precipitated mixture has to be separated from the rest of the treated liquor and this involves additional processing steps and/or a definite increase in the quantity of the total mud load which has to be disposed of. In U.S. Pat. No. 4,101,629 (Mercier et al), a barium-containing compound is added to Bayer process liquors. The barium compound precipitates as barium aluminate and the precipitated material may also include barium salts of organic impurities present in the liquor. This process also involves precipitation of a compound which has to be removed from the treated liquor thus requiring settling and/or filtration equipment and additional processing steps. The process allows recovery and reuse of the filtered barium compound by calcination; however, the well-known toxicity of barium salts may create an unacceptable environmental and/or health risk not justifiable by the purification results obtainable by it. Other patents, relating to the incorporation of additives in Bayer process liquors for the removal of organics, include U.S. Pat. Nos. 4,275,042, 4,275,043, 3,832,442.

Another method of eliminating dissolved organic compounds from Bayer process liquors involves the oxidation of the organics using oxygen or an oxygen-containing gas. In United Kingdom Patent Application No. 2,037,722 (published July 16, 1980), organic compounds are removed from Bayer process liquors by introducing large quantities of oxygen into the liquor kept at 120°–350° C. until a partial oxygen pressure of 3–30 atmospheres is attained. As the oxidation proceeds additional oxygen or air is introduced into the pressurized system. The method can achieve total oxidation of the organic content of the liquor during the digestion step at the recommended 210°–300° C. temperature and the solid residue of the oxidation, mainly sodium carbonate, will be removed together with the red mud. While this process destroys organic contaminants including the humates in the liquor, it is associated with certain operational and mechanical difficulties which render this total oxidation method unattractive. These involve the use of large volumes of oxygen and even larger volumes of oxygen-containing gas, such as air, and the inherent difficulty of introducing such large volumes into a pressurized, high temperature system. Additionally, the process forms a relatively large quantity of solids which tend to scale the equipment used. Oxidation of a large proportion of total organic content results in the formation of large quantities of oxalate and in the excessive carbonation of the process liquor, both of which are highly undesirable. Also, oxidation of the entire organic contaminant content is a time-consuming reaction and, as shown, it requires 3–60 minutes to destroy 20–30% of the organics at 180° C. For better oxidation results higher termperatures are required, for example at 260°–280° C. about 97% oxidation can be achieved. Since most Bayer process digestions are accomplished at temperatures below about 250° C., it becomes evident that to accomplish complete oxidation at the usual digestion temperatures either the time period of digestion has to be significantly lengthened or the oxygen charge to the digestion has to be substantially increased, or both of these alternatives must be applied to obtain satisfactory results.

In U.S. Pat. No. 4,215,094 it is recommended that the oxidation of organics present in the liquor be accomplished at 180°–300° C. and at 20–150 kg/cm$^2$ pressure (19.3–145 atm) in the presence of a copper salt catalyst which is added in an amount equal to 300–5,000 g/L copper ion. Regardless of the catalyst addition and the high pressure and temperature applied, the best oxidation results shown at the usual digestion temperatures are in the range of 10–48%. In addition, the copper catalyst has to be removed from the treated liquor to avoid contamination. Disposal of the removed copper catalyst can create environmental and/or health hazards.

The instant process, which is directed to the removal of the humate content of the contaminated Bayer process liquor, avoids all of these aforementioned difficulties. The desired humate destruction is accomplished by introducing in the Bayer process liquor only as much oxygen as is soluble in the liquor under the particular processing conditions. This avoids the use of temperatures which are above the conventionally employed range, avoids the use of catalysts and large quantities of oxygen or air, accomplishes humate destruction well within the time available in the digestion stage of the Bayer process and makes use of existing process equipment.

SUMMARY OF THE INVENTION

Caustic Bayer process liquors, contaminated with humate impurities, are treated with oxygen under conventional digestion conditions by limiting the oxygen quantity added to the liquor to such an amount which is at or below the solubility limit of oxygen in the liquor under the particular processing step. By controlling the oxygen quantity as set forth, excessive pressures and temperatures can be avoided while simultaneously most of the humate impurities can be destroyed within normal digestion times at a significantly reduced oxygen consumption.

BRIEF DESCRIPTION OF THE FIGURES

FIG. 1 shows the solubility of oxygen in a caustic aluminate liquor at constant caustic concentration and at varying temperatures in a closed system.

FIG. 2 shows the relationship of humate destruction (as measured by light absorbance differences) versus reaction time at 243° C. digestion temperature and at 0.8 g/L oxygen charge.

FIG. 3 depicts the relationship of humate destruction (as measured by light absorbance difference) versus reaction time at 200° C. preheating temperature and at 0.5 g/L oxygen charge.

FIG. 4 demonstrates the effects of varying oxygen quantities (all within the equilibrium solubility limit) on humate destruction at 200° C. versus reaction time.

FIG. 5 schematically shows the predigestion and digestion stages of the Bayer process with dotted lines indicating suitable areas where oxygen can be added to the system for humate removal.

DETAILED DESCRIPTION OF THE INVENTION

This invention relates to the purification of caustic Bayer process liquors. More particularly, it relates to the removal of organic contaminants, such as humates, from impure Bayer process liquor by oxidation.

The terms "humate" or "humates" as used herein refer to high molecular weight organic compounds having at least twenty carbon atoms commonly present in bauxites.

The expression "A/C" refers to the alumina to caustic ratio in caustic Bayer liquors, wherein the alumina is expressed in $Al_2O_3$ grams/liter, while the caustic is expressed in $Na_2CO_3$ grams/liter.

The terms "caustic Bayer liquor" or "caustic liquor" refer to alkaline process streams utilized in the processing of bauxite to alumina trihydrate.

These process streams include the liquor used to digest bauxite, the pregnant liquor obtained as a result of digestion and the spent liquor which is depleted in alumina content due to precipitation. An A/C ratio generally from about 0.30 to about 0.72 illustrates the range from the most dilute to the most concentrated caustic liquor employed in the Bayer process.

The terms "oxygen solubility" and "equilibrium oxygen solubility" as used herein refer to the quantity of oxygen, expressed in grams which dissolves in a liter of caustic liquor under the process conditions used for humate removal from Bayer liquors. The pertinent process parameters include temperature and pressure and also the caustic concentration of the liquor expressed in grams per liter $Na_2CO_3$. The internal pressure in digesters, heaters and associated equipment is normally maintained at levels greater than the vapor pressure of the liquor within these vessels, so that the solubility of oxygen is enhanced.

For most plants employing the Bayer process for the production of alumina trihydrate from bauxite sources, the humate removal process of the present invention can be advantageously utilized in the predigestion stage and/or in digestion. The predigestion stage generally involves the preheating of the caustic liquor and/or caustic liquor-bauxite slurry up to digestion temperature prior to digestion. It may also include a desilication step, which is utilized to react and precipitate a portion of the silica content of bauxite prior to digestion. The humate removal process of the invention can be applied in these predigestion stages provided the temperature and/or pressure is sufficiently high to provide a reasonably fast rate of reaction between the dissolved oxygen and the humate content of the liquor. Since digestion of the bauxite usually takes place under elevated temperature and pressure conditions, a fast rate of reaction between the oxygen and the humate impurity is assured.

It has been found that in order to assure an acceptable rate of humate removal by oxidation the temperature of the treatment should be at least about 200° C., preferably not less than about 140° C. The upper limit of the treatment temperature is generally established by the conditions set for the particular Bayer process operation, for example the conditions existing in the preheating, desilication or digestion steps. Since the instant humate removal process uses oxygen only up to a quantity which dissolves in the liquor, oxygen will contribute very little to the total pressure of the system, which will be determined mainly by the vapor pressure generated due to the temperatures existing in the treatment vessels, and by the overpressure afforded by the various feed pumps.

Introduction of oxygen for humate removal according to the invention can be accomplished as mentioned before, in the liquor and/or slurry preheating stages, during the desilication step or in the digestion stage. Since the rate of humate removal is dependent on the temperature, it is preferred to employ the oxygen only in such treatment vessels where the temperature is a least about 100° C. Thus, in the liquor or slurry preheating stage, which generally utilizes two or more preheating vessels, as is also shown in FIG. 5, the oxygen should be introduced only into one of those vessels in which the temperature is at least 100° C. In the predesilication stage, which is utilized by some Bayer process alumina production facilities, the instant humate removal process can be advantageously applied provided the temperature in the predesilication stage is in excess of 100° C. Naturally, since digestion of bauxite is accomplished at temperatures in excess of about 140° C., the instant humate oxidation process can be readily employed in the digestion stage.

The humate constituent of the the total organic impurity content of bauxites is very small, generally about 5–15% by weight of the total organic carbon content. Consequently, the quantity of oxygen to be employed for the oxidative destruction of the humate is also very small, since the total organic content of bauxites is generally less than about 0.2% by weight of the bauxite. It has been found that to effect satisfactory humate removal from the liquor or slurry, the quantity of oxygen capable of remaining in solution at the treatment temperatures utilized is sufficient to oxidize the humate content. For practically all bauxites the quantity of oxygen which is capable of dissolving in the liquor or slurry is more than enough to control the humate content in liquor to low and satisfactory levels. Thus, in batch processes a single introduction of the equilibrium solubility quantity of oxygen is sufficient, while in continuous or semicontinuous preheating, desilication or digestion processes, the required quantity of oxygen is charged in relation to the rate of introduction of humates into the process vessels.

As it has been mentioned before, the quantity of oxygen which dissolves in the liquor or slurry depends on the temperature of these process streams. Table I below illustrates the quantity of oxygen which is capable of dissolving in a caustic liquor having a caustic concentration of 250 grams/liter (calculated as $Na_2CO_3$) at varying temperatures. The temperature-dissolved oxygen relationship is also shown graphically in FIG. 1.

TABLE I

| Oxygen Solubility in a Caustic Liquor* As a Function of Temperature | |
|---|---|
| Temperature in °C. | Dissolved Oxygen Content $O_2$ grams/L Liquor |
| 77° | 0.18 |
| 120° | 0.23 |
| 146° | 0.25 |
| 166° | 0.44 |
| 186° | 0.55 |
| 211° | 0.63 |
| 237° | 0.83 |
| 253° | 1.04 |

*Caustic conc. = 250 g/L

Considering that bauxites generally contain less than about 0.2% by weight organic carbon and only about 5–15% of such organic carbon can be attributed to the humate content, it becomes readily observable that, even at about 100° C., the dissolved oxygen content of the liquor is more than sufficient to oxidize the humate constituent of the liquor. Due to the small quantity of oxygen required for humate removal, the introduction of oxygen into the process vessels can be easily and economically accomplished without the necessity of using special high pressure transfer equipment, for example pumps modified for oxygen introduction. The present humate removal process allows the direct introduction of oxygen from oxygen storage vessels, which contain compressed oxygen. Other advantages of the instant humate removal process are readily observable from the examples presented hereinafter.

EXAMPLE I

Batch digestion of Jamaican bauxite was carried out with simultaneous destruction of its humate content. The bauxite composition is shown in Table II.

TABLE II

| Jamaican Bauxite Composition | |
|---|---|
| Component | % By Weight (Dry Basis) |
| $Al_2O_3$ | 47.6–48.8 |
| $SiO_2$ | 0.6–1.0 |
| $Fe_2O_3$ | 17.9–18.4 |
| Organic carbon as C | 0.15–0.25 |
| Humate carbon as C* | 0.009–0.02 |

*Determined by absorbance

The bauxite was slurried in caustic liquor and the slurry had an A/C ratio of 0.411 and a caustic concentration of 242 g/L. This slurry was charged to the digester and heated to 243° C. When the slurry reached the desired temperature 0.5 g/L $O_2$ was charged to the digester from a cylinder containing compressed oxygen. This quantity of oxygen was significantly less (0.5 g/L v. 0.9 g/L) than the quantity that is capable of dissolving in the slurry at the digestion temperature utilized. The course of humate destruction was followed by measuring the change in the color of the slurry through colorimetric means. The colorimetric means utilized was a Pye Unicam Model 6-350 spectrophotometer and the light absorbance change was measured at 691 nm in a 4 cm cell. Calibration of the instrument was accomplished by using a humate standard. Table III presents the rate of humate removal as a function of time under the digestion conditions described and the results are also graphically shown in FIG. 2.

TABLE III

| Humate Destruction in Digestion | | |
|---|---|---|
| Time In Minutes | Absorbance (At 691 nm) | Humate Destruction in % |
| 0 | 0.304 | 0 |
| 2 | 0.235 | 22.7 |
| 16 | 0.152 | 50.0 |
| 26 | 0.137 | 54.9 |
| 40 | 0.130 | 57.2 |
| 60 | 0.123 | 59.5 |

EXAMPLE II

Humate removal was accomplished during the preheating of Bayer process (test tank) liquor. This liquor, when preheated to digestion temperature, is then combined with bauxite slurry and the combined liquor-bauxite slurry composition is subjected to digestion. The test tank liquor utilized in this example had been previously subjected to several Bayer process cycles and as a result had a dark red color due to the high dissolved humate content. This caustic liquor had a caustic concentration of 225 g/L and was introduced into the preheating stage of the Bayer process. The preheating stage, as shown in FIG. 5, consisted of several preheating vessels connected in series and the liquor was preheated in stages. Since the rate of humate oxidation is dependent on the temperature, oxygen was introduced to a specific preheating vessel where the test tank liquor temperature was to be raised to about 200° C. At this temperature the oxygen equilibrium solubility equals about 0.60 g/L at the given caustic concentration, however only 0.50 g/L oxygen was charged. The humate destruction was followed by absorbance measurements and the results were tabulated as a function of time and are shown in Table IV and are also graphically depicted in FIG. 3.

TABLE IV

| | Humate Destruction in Preheating | |
|---|---|---|
| Time In Minutes | Absorbance (At 691 nm) | Humate Destruction in % |
| 0 | 0.350 | 0 |
| 2 | 0.267 | 23.7 |
| 7 | 0.212 | 39.4 |
| 16 | 0.162 | 53.7 |
| 26 | 0.141 | 59.7 |
| 40 | 0.129 | 63.1 |
| 60 | 0.122 | 65.1 |

It can be observed that when only about 80% of the quantity of oxygen is supplied of the total capable of being dissolved in the caustic liquor more than 50% of the total humate content can be readily destroyed in less than about 15 minutes. Longer residence times, coupled with addition of oxygen up to the equilibrium solubility limit at the given temperature, can significantly increase the degree of humate destruction.

EXAMPLE III

Tests were conducted to establish the effect of varying oxygen quantities on humate destruction at a constant temperature and at a preselected caustic concentration. Thus, humate-containing spent liquor, obtained from the precipitation stage of the Bayer process after removal precipitated alumina trihydrate from it, was subjected to the humate destruction step of the instant process. The spent liquor had an A/C ratio of 0.342 and a caustic concentration of 225 g/L. Humate destruction was carried out at 200° C. by charging varying quantities of oxygen to the liquor sample up to the limit of oxygen solubility under the test conditions. It was found that considerable humate destruction can be achieved even if only one-half of the total oxygen capable of remaining dissolved in the spent liquor is charged to the liquor. Table V provides the results in tabulated form, while FIG. 4 graphically shows the same.

TABLE V

| | Humate Destruction as a Function Of $O_2$ Quantity* | | | | | | | | |
|---|---|---|---|---|---|---|---|---|---|
| $O_2$ in g/L | Time in Minutes | | | | | | | | |
| | 0 | 5 | 10 | 15 | 20 | 25 | 30 | 35 | 40 |
| | Absorbance at 691 nm | | | | | | | | |
| 0.1 | 0.376 | 0.340 | 0.332 | 0.330 | — | — | — | — | — |
| 0.2 | 0.376 | 0.306 | 0.291 | 0.286 | — | — | — | — | — |
| 0.3 | 0.376 | 0.276 | 0.252 | 0.244 | 0.240 | — | — | — | — |
| 0.4 | 0.376 | 0.252 | 0.222 | 0.208 | 0.202 | 0.198 | 0.196 | 0.194 | — |
| 0.5 | 0.376 | 0.228 | 0.192 | 0.176 | 0.166 | 0.160 | 0.156 | 0.156 | — |
| 0.6 | 0.376 | 0.218 | 0.170 | 0.150 | 0.138 | 0.130 | 0.124 | 0.120 | 0.116 |
| 0.7 | 0.376 | 0.192 | 0.150 | 0.128 | 0.115 | 0.107 | 0.100 | 0.094 | 0.090 |

*At 200° C. and 225 g/L caustic concentration

It can be observed that the very small quantities of oxygen utilized can accomplish substantial reduction in humate content within reasonably short reaction times. Due to these small oxygen quantities employed, the present humate removal process does not require extensive oxygen charging equipment; in most instances the oxygen can be directly charged from vessels containing it under compression. Also, by using these small quantities, one does not encounter the serious corrosion problems of the prior art wet oxidation processes.

We claim:

1. In the process of purifying caustic Bayer process liquors containing organic contaminants including humates by oxidizing the contaminants at elevated temperatures and pressures with oxygen or an oxygen-containing gas, the improvement which comprises destroying humates in the contaminated liquor at a temperature in excess of 140° C. by adding to the organic contaminated liquor molecular oxygen in a limited quantity, the quantity of oxygen to be added being kept at or below the solubility limit of oxygen in the liquor, such solubility limit being established by determining the caustic concentration of the liquor and the temperature and pressure under which the oxidation of the humates take place, said solubility limit, at alumina to caustic ratios from about 0.32 to about 0.72 in which ratios the alumina is expressed as $Al_2O_3$ g/liter and the caustic is expressed as $Na_2CO_3$ g/liter, is approximately 1.0 g of $O_2$/liter of liquor at temperatures at about 300° C. and less at lower temperatures, determining the oxygen solubility under the said selected oxidation conditions, then accomplishing the destruction of humates under the selected oxidation conditions and recovering a liquor of substantially reduced humate content.

2. A process according to claim 1, wherein the caustic liquor subjected to the humate oxidation treatment is spent liquor, bauxite slurry or combination of both.

3. A process according to claim 1, wherein the humate destruction is accomplished in a predigestion stage of the Bayer process, such predigestion stage consisting of spent liquor preheating and/or predesilication.

4. A process according to claim 1, wherein the humate destruction is accomplished in the digestion stage of the Bayer process.

5. A process according to claim 1, wherein the humate destruction is accomplished at a temperature of at least about 200° C.

6. A process according to claim 1, wherein the humate destruction is accomplished in a continuous manner.

* * * * *